G. J. Parham's Trap.
71321 Fig. 1.
PATENTED
NOV 26 1867
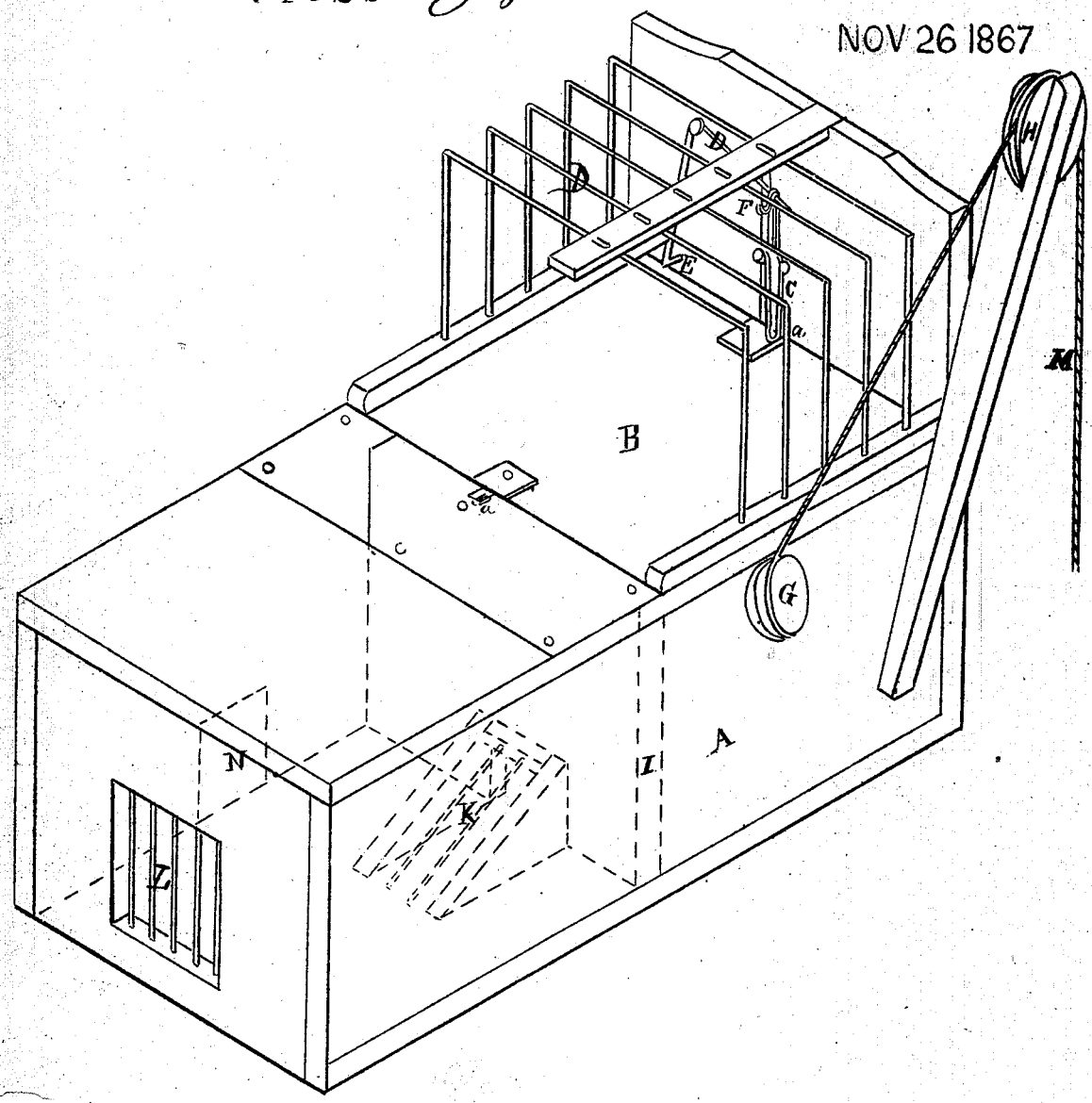
Witnesses: F. Lehmann, Jno. A. Ellis
Inventor: Geo. J. Parham
per J. H. Alexander & Co.
atty.

United States Patent Office.

GEORGE J. PARHAM, OF HARRODSBURG, INDIANA.

Letters Patent No. 71,321, dated November 26, 1867.

---

IMPROVED ANIMAL-TRAP.

---

The Schedule referred to in these Letters Patent and making part of the same.

---

TO ALL WHOM IT MAY CONCERN:

Be it known that I, GEORGE J. PARHAM, of Harrodsburg, State Indiana, have invented certain new and useful Improvements in Animal-Traps; and I declare the following to be a full, clear, and exact description of the same, reference being had to the accompanying drawings, and to the letters of reference marked thereon.

Figure 1 is a perspective view of my trap.

Letter A represents the frame of the trap. Upon the top of the box or frame A is placed the revolving trap-door B. This door is pivoted in its centre to the sides of the box, in such a way as to allow it to revolve freely. Upon each end of this door there is placed a small rod-like projection, $a$, so as to catch in the loop or stirrup C, and prevent it from turning. Letter D represents a grated cover, which extends over the trap-door B, so as to prevent the animals from seizing the bait from behind or to one side. The rear end of the frame is made to extend upwards, to some distance above the trap-door B. To the side of this upright is attached the spring E, which answers for a double purpose. It is formed in such a manner that it will allow the door to pass it, but not to return again. The spring passes upward where it is secured to the frame, and then the other end is made to catch in the bait-hook F, in such a manner as to hold it in its place. The loop or stirrup C and the bait-hook F are formed out of one piece of metal, and are so arranged, that as long as the spring E holds the hook against the frame, the loop extends out far enough to receive the rod-like projection upon the end of the trap-door B, as shown in red lines; but when the hook F is drawn forward, the loop is drawn from under the door, and the slightest weight will cause the door to tilt downward. Attached to the pivot upon which the trap-door revolves, is the spool G, around which a cord is wound. This cord is then made to pass over the pulley H, and attached to a weight heavy enough to draw the door B back to its place each time that it is tilted over.

The interior of the box A is divided into two compartments, which are separated from each other by the partition I, (as shown in red lines.) Letter K represents a grated door in the partition I, through which the animal passes.

The bait is placed upon the hook F, and the animal, in order to get to it, must pass over the door B. As soon as he seizes the bait and draws it towards him, he pulls the loop C from under the door, and he is immediately precipitated into the box below. Seeing the light from the grated window L, he passes through the door K, when he is caged, and then can only be removed by the door N. As soon as the weight of the animal presses the door downwards, the weight that is attached to the cord M draws the door around until it again catches in the loop C, when it is set for the next animal.

Having thus described my invention, what I claim, and desire to secure by Letters Patent, is—

I claim the spring E, trigger C, grated cover D, revolving trap-door B, spool G, pulley H, and cord M, all arranged in the manner and for the purpose specified.

In testimony that I claim the foregoing as my own, I hereby affix my signature in the presence of two witnesses.

GEO. J. PARHAM.

Witnesses:
PETER WOLFE,
FREDERIC T. BELLTER.